(12) United States Patent
Regan et al.

(10) Patent No.: US 10,616,306 B2
(45) Date of Patent: Apr. 7, 2020

(54) SYSTEM AND METHOD FOR LARGE-SCALE CAPTURE AND TRACKING OF WEB-BASED APPLICATION PARAMETERS

(71) Applicant: Verizon Patent and Licensing Inc., Arlington, VA (US)

(72) Inventors: Ryan William Regan, Somerville, NJ (US); Johanna Del Pino, Hackensack, NJ (US); Dimitri Kvares, Randolph, NJ (US); Mutaz Geegeeh, Edison, NJ (US)

(73) Assignee: Verizon Patent and Licensing I n c., Basking Ridge, NJ (US)

( * ) Notice: Subject to any disclaimer, the term of this patent is extended or adjusted under 35 U.S.C. 154(b) by 189 days.

(21) Appl. No.: 15/840,715

(22) Filed: Dec. 13, 2017

(65) Prior Publication Data

US 2019/0182312 A1 Jun. 13, 2019

(51) Int. Cl.
*G06F 15/16* (2006.01)
*H04L 29/08* (2006.01)
*H04L 12/26* (2006.01)
*G06F 3/0481* (2013.01)

(52) U.S. Cl.
CPC ........ *H04L 67/025* (2013.01); *G06F 3/04817* (2013.01); *H04L 43/16* (2013.01); *H04L 43/50* (2013.01); *H04L 67/02* (2013.01); *H04L 67/04* (2013.01); *H04L 67/22* (2013.01); *H04L 67/36* (2013.01)

(58) Field of Classification Search
CPC ..... G06F 3/04817; H04L 43/16; H04L 43/50; H04L 67/02; H04L 67/025; H04L 67/04; H04L 67/22; H04L 67/36
See application file for complete search history.

(56) References Cited

U.S. PATENT DOCUMENTS

| | | | |
|---|---|---|---|
| 6,339,750 B1 * | 1/2002 | Hoyer | G06F 11/324 702/179 |
| 7,730,193 B2 * | 6/2010 | Sargent | H04L 41/22 370/230 |
| 8,266,281 B1 * | 9/2012 | Carlson | G06F 11/3419 709/203 |

(Continued)

OTHER PUBLICATIONS

Section, What is an AJAX Call?, Aug. 24, 2017, https://www.section.io/blog/what-is-an-ajax-call-javascript/. (Year: 2017).*

*Primary Examiner* — Moustafa M Meky
*Assistant Examiner* — Thorne E Waugh

(57) ABSTRACT

A system described herein may track performance information associated with user interaction components provided via, for example, web pages. The system may determine a time at which a request was received (e.g., when a particular user interaction component is interacted with by a user), and a time at which the request was fulfilled. The system may perform similar functions at multiple devices, in order to determine overall performance information associated with the same user interaction component. This tracking may be performed in an application-agnostic manner (e.g., developers of web pages may not need to specifically request that the performance be tracked). Alerts may be generated when the performance information exceeds acceptable limits.

20 Claims, 9 Drawing Sheets

(56) References Cited

U.S. PATENT DOCUMENTS

| | | | | |
|---|---|---|---|---|
| 8,516,084 | B1* | 8/2013 | Grieve | H04L 69/28 |
| | | | | 709/219 |
| 9,921,733 | B2* | 3/2018 | Filippi | G06F 3/04847 |
| 9,923,793 | B1* | 3/2018 | Gore | H04L 43/0876 |
| 9,961,129 | B2* | 5/2018 | Acharya | H04L 67/10 |
| 10,165,071 | B2* | 12/2018 | Zhang | H04L 67/22 |
| 10,331,432 | B2* | 6/2019 | Oliver | H04L 67/02 |
| 2007/0118640 | A1* | 5/2007 | Subramanian | G06F 11/3419 |
| | | | | 709/224 |
| 2008/0040653 | A1* | 2/2008 | Levine | G06Q 30/02 |
| | | | | 715/205 |
| 2008/0114875 | A1* | 5/2008 | Anastas | G06F 16/986 |
| | | | | 709/224 |
| 2011/0055683 | A1* | 3/2011 | Jiang | G06F 16/957 |
| | | | | 715/234 |
| 2017/0310791 | A1* | 10/2017 | Palse | H04L 67/1008 |
| 2018/0007165 | A1* | 1/2018 | Mathur | H04L 67/327 |
| 2018/0157405 | A1* | 6/2018 | Filippi | G06F 3/04847 |

\* cited by examiner

| Activity | Name | Request timestamp | Response timestamp | Elapsed time | URL | Comment |
|---|---|---|---|---|---|---|
| Account actions | viewAccountInfo | 7:57:01 | 7:57:19 | 0:18 | www.xyzabc.com/account | user may click this to view overall account information |

315

| User ID | Activity | Name | Request timestamp | Response timestamp | Elapsed time | URL | Comment |
|---|---|---|---|---|---|---|---|
| user_A | Account actions | viewAccountInfo | 7:57:01 | 7:57:19 | 0:18 | www.xyzabc.com/account | user may click this to view overall account information |
| user_B | Account actions | viewAccountInfo | 7:57:35 | 7:57:59 | 0:24 | www.xyzabc.com/account | user may click this to view overall account information |
| user_C | Account actions | changeSub | 7:59:01 | 7:59:08 | 0:07 | www.xyzabc.com/change | user may click this to change subscription info |
| user_D | Customer service | chatRep | 7:59:58 | 8:00:00 | 0:02 | www.xyzabc.com/chatQueue | user may click this to enter a chat queue |
| user_D | Customer service | chatRepSend | 8:01:17 | 8:01:20 | 0:03 | www.xyzabc.com/chatSend | user may click this to send text to a representative |
| user_E | null | button_A | 7:57:01 | 7:57:19 | 0:18 | www.xyzabc.com/account | null |

| Activity | Name | Average response time | URL | Comment |
|---|---|---|---|---|
| Account actions | viewAccountInfo | 0:21 | www.xyzabc.com/account | user may click this to view overall account information |
| Account actions | changeSub | 0:10 | www.xyzabc.com/change | user may click this to change subscription info |

| Activity | Name | Average response time | Avg. response time (morning) | Avg. response time (evening) | Avg. response time (Eastern US) | Avg. response time (Western US) |
|---|---|---|---|---|---|---|
| Account actions | viewAccountInfo | 0:21 | 0:07 | 0:55 | 0:19 | 0:23 |
| Account actions | changeSub | 0:10 | 0:03 | 0:17 | 0:14 | 0:09 |

| Activity | Average response time | Avg. response time (user age 18-24) | Avg. response time (user age 25-34) | Avg. response time (user age 35-44) |
|---|---|---|---|---|
| Account actions | 5:43 | 4:32 | 5:31 | 7:13 |
| Customer service | 11:57 | 9:59 | 10:35 | 17:01 |

SYSTEM AND METHOD FOR LARGE-SCALE CAPTURE AND TRACKING OF WEB-BASED APPLICATION PARAMETERS

BACKGROUND

Web applications are often developed and maintained by different entities, such as different companies or different divisions within one company. Users (e.g., customers or potential customers) who use these web applications may sometimes experience delays or other problems when interacting with the web applications, but it may be difficult for trends (e.g., trends relating to delays, technical problems, or other problems) to be identified and corrected, due to the fact that the different applications or different aspects of a user's experience may be managed by different systems or entities.

BRIEF DESCRIPTION OF THE DRAWINGS

FIGS. 5-8 illustrate example data structures that include information regarding multiple user interactions, by multiple users, with multiple components;

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may provide for the tracking of the overall performance of a system (e.g., one or more web applications). The tracking may be performed based on metrics directly relating to a user's experience, which may give an accurate representation of the performance of the system.

Figure 1:
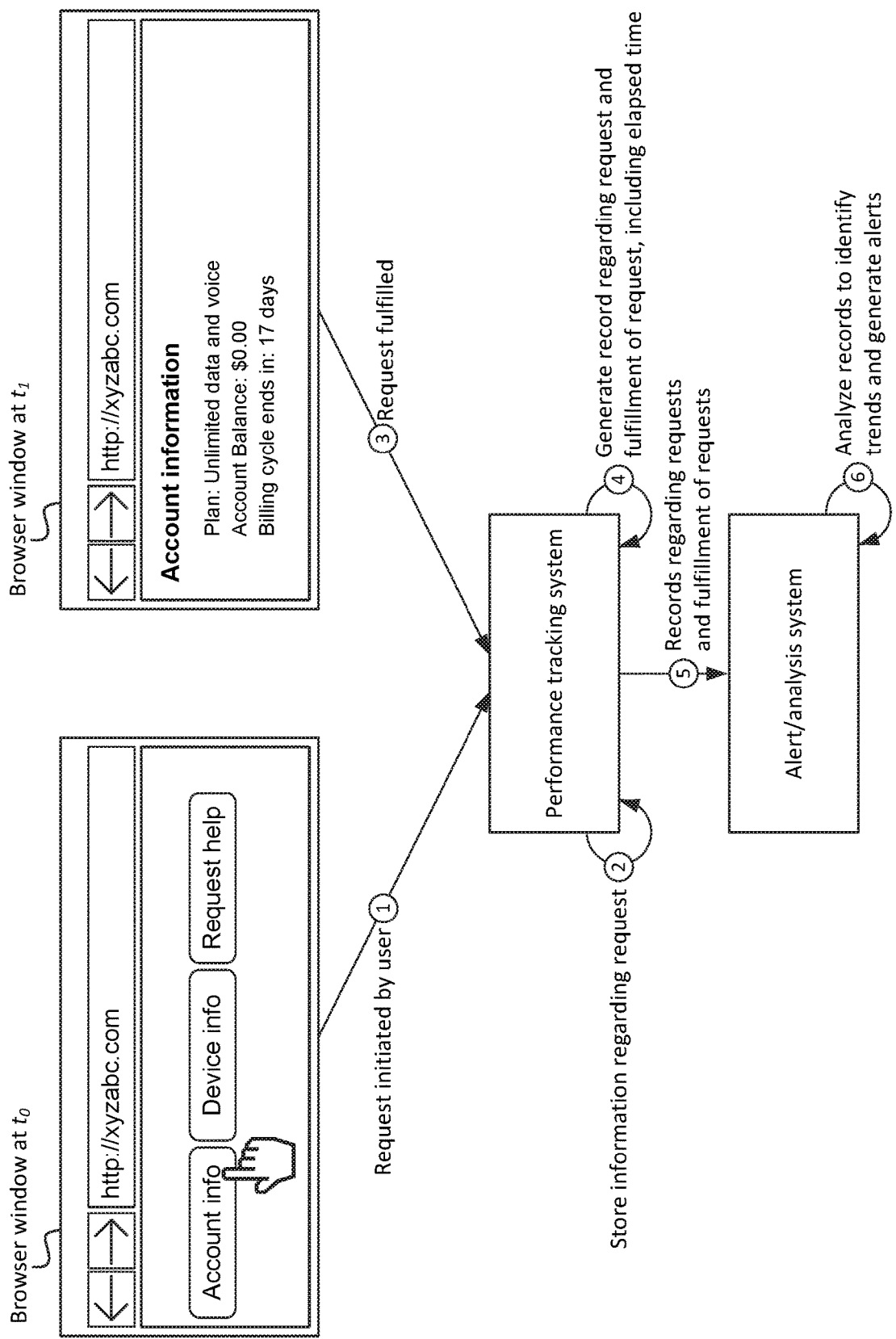
FIG. 1 illustrates an overview of one or more embodiments described herein.

For example, referring to FIG. 1, a web browser may present a web page that includes user interaction components (e.g., buttons, links, and/or other graphical elements) that can be interacted with by a user. The web page may be a dynamic web page where the displayed content changes, even if the browser does not navigate to a new web page. For example, as shown, the browser may have loaded a web page associated with the Uniform Resource Locator ("URL") "http://xyzabc.com," and selections of the components may not cause navigation to a different URL. For example, selection of the components may trigger Extensible Markup Language ("XML") Hypertext Transfer Protocol ("HTTP") Request ("XHR") requests, script functions, and/or other types of functions that cause content to be retrieved without reloading the web page (e.g., without navigating to another web page, in lieu of the web page that is already presented).

The example components shown in FIG. 1 are the "Account info" button, the "Device info" button, and the "Request help" button. These buttons may be shown at an initial time $t_0$. As shown, the user may initiate a request to be fulfilled by the browser, by selecting the "Account info" button. In accordance with some embodiments, a performance tracking system may receive (at arrow "1") an indication that the user has initiated the request. For example, the performance tracking system may communicate with the browser via an Application Programming Interface ("API"), one or more libraries installed in the browser, and/or via some other technique.

The performance tracking system may store (at arrow "2") information regarding the request. The information may include, for example, a timestamp associated with the request (e.g., a time at which the user selected the "Account info" button), a name of the component associated with the request (e.g., a name or identifier associated with the "Account info" button, which may have been provided by a developer of the web page or automatically generated by the performance tracking system), an identifier associated with the user or a device that is running the web browser, and/or other information.

As further shown in FIG. 1, the browser window may display, at time $t_1$, the content requested by the user at time $t_0$. Specifically, the browser window may display an "Account information" page. In some embodiments, the content may be displayed without reloading the web page currently presented by the browser (that is, without navigating to a new URL (e.g., as shown, the URL displayed in an address bar of the browser may be "http://xyzabc.com" at both times $t_0$ and $t_1$)). The performance tracking system may receive (at arrow "3") an indication that the user request has been fulfilled (e.g., by retrieving and displaying the requested content).

The performance tracking system may generate (at arrow "4") a record regarding the request and the fulfillment of the request, including the time elapsed from the initiation of the request to the fulfillment of the request. The record may also include the information regarding the name of the component, the identifier of the user, etc. The performance tracking system may provide (at arrow "5") the generated record (along with other records, if applicable) to an alert/analysis system. The alert/analysis system may receive records pertaining to multiple users, as well as multiple requests (and corresponding fulfillments of the requests). In this manner, the alert/analysis system may, over time, receive information pertaining to thousands, hundreds of thousands, millions (or more) requests, and may analyze (at arrow "6") the records to identify trends in real-time or near real-time and/or generate alerts. For example, if a particular element is associated with unusually long times to fulfill requests, this may indicate that the devices or systems involved with fulfilling requests associated with the particular element are malfunctioning or are otherwise underperforming.

As described in more detail below, multiple different elements may be associated with an "activity" (e.g., a developer of a web page may indicate that certain components are associated with a particular activity). The records may further indicate the activity with which a particular request is associated, and the alert/analysis system may further be able to identify trends associated with activities. As one example, one activity may relate to paying a bill via a web page, and the activity may include interacting with multiple different components (e.g., a "Pay my bill" button, a "select payment method" button, etc.). In this manner, the alert/analysis system may be able to provide performance information which is further user experience-centric.

Figure 2:
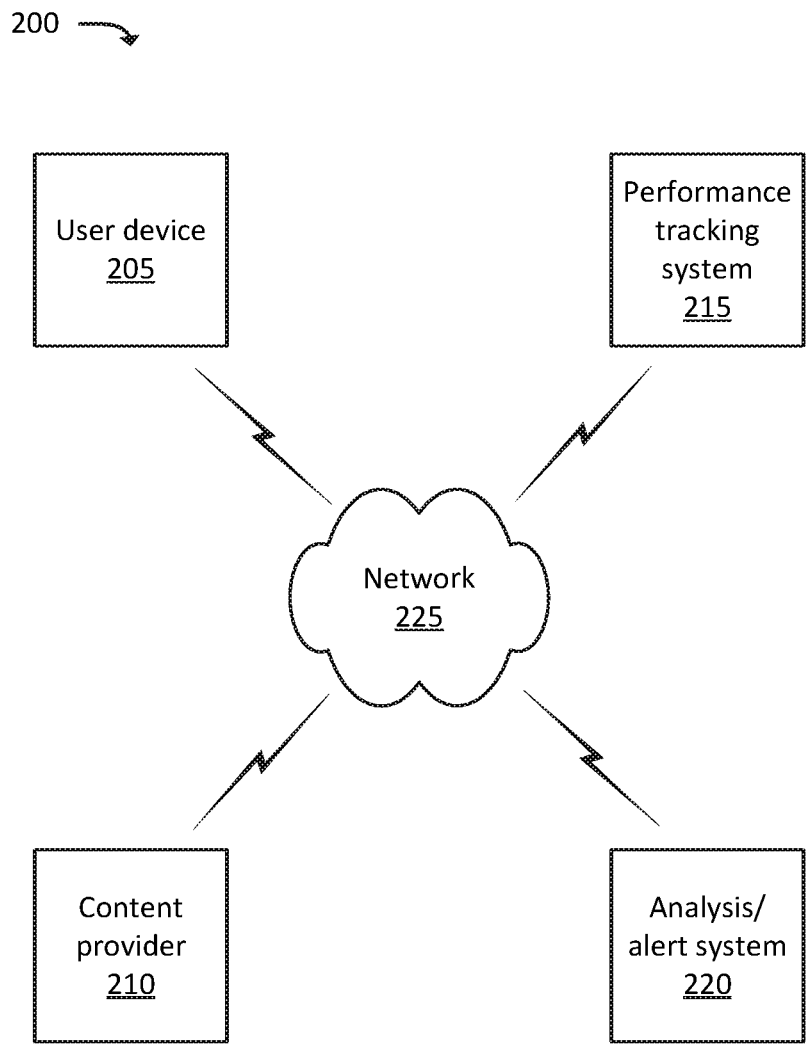
FIG. 2 illustrates an example environment in which one or more embodiments, described herein, may be implemented.

FIG. 2 illustrates an example environment 200, in which one or more embodiments, described herein, may be implemented. As shown in FIG. 2, environment 200 may include user device 205, content provider 210, performance tracking system 215, analysis/alert system 220, and network 225. The quantity of devices and/or networks, illustrated in FIG. 2, is provided for explanatory purposes only. In practice, environment 200 may include additional devices and/or networks; fewer devices and/or networks; different devices and/or networks; or differently arranged devices and/or networks than illustrated in FIG. 2. For example, while not shown, environment 200 may include devices that facilitate or enable communication between various components shown in environment 200, such as routers, modems, gateways, switches, hubs, etc. Alternatively, or additionally, one or more of the devices of environment 200 may perform one or more functions described as being performed by another one or more of the devices of environments 200. Devices of environment 200 may interconnect with each other and/or other devices via wired connections, wireless connections, or a combination of wired and wireless connections. In some implementations, one or more devices of environment 200 may be physically integrated in, and/or may be physically attached to, one or more other devices of environment 200.

User device 205 may include any computation and communication device that is capable of communicating with one or more networks (e.g., network 225). For example, user device 205 may include a device that receives content, such as web pages (e.g., that include text content and/or image content), streaming audio and/or video content, and/or other content, via an Internet connection and/or via some other delivery technique. In some implementations, user device 205 may be, may include, or may be a logical portion of, a radiotelephone, a personal communications system ("PCS") terminal (e.g., a device that combines a cellular radiotelephone with data processing and data communications capabilities), a personal digital assistant ("PDA") (e.g., a device that includes a radiotelephone, a pager, etc.), a smart phone, a laptop computer, a tablet computer, a camera, a television, a personal gaming system, a wearable device, and/or another type of computation and communication device.

Content provider 210 may include a device (or a collection of devices) that provide content (e.g., web content, such as web pages, video content, and/or other types of content) to user device 205. In some embodiments, content provider 210 may respond to requests from user device 205, such as HTTP requests, XHR requests, and/or other types of request for content.

Performance tracking system 215 may include a device (or a collection of devices) that determine performance information regarding requests for content (e.g., by one or more user devices 205) from one or more content providers 210. For example, as described herein, performance tracking system 215 may determine when a particular user device 205 requests content from content provider 210, and may determine when the request has been fulfilled (e.g., when the content is provided to content provider 210 and/or when the content is rendered by an application of user device 205, such as a browser application). In some embodiments, performance tracking system 215 may be implemented partially or entirely within user device 205. For instance, performance tracking system 215 may include a library, plug-in, and/or other software logic that communicates with one or more applications executed by user device 205 (e.g., a web browser application via which requests for content are received from a user of user device 205).

Analysis/alert system 220 may include a device (or a collection of devices) that analyzes performance information (e.g., as determined by performance tracking system 215), in order to identify trends associated with the performance information. For example, analysis/alert system 220 may detect when certain actions or types of requests are taking longer than an acceptable threshold. Analysis/alert system 220 may output alerts to one or more other devices (e.g., a user device 205 associated with an administrator and/or other entity) to indicate that one or more thresholds have been satisfied.

Network 225 may include one or more radio access networks ("RANs"), via which user device 205 may access one or more other networks or devices, a core network of a wireless telecommunications network, an IP-based packet data network ("PDN"), a wide area network ("WAN") such as the Internet, a private enterprise network, and/or one or more other networks. In some implementations, network 225 may be, or include, a cellular network, such as a Long-Term Evolution ("LTE") network, a Third Generation ("3G") network, a Fourth Generation ("4G") network, a Fifth Generation ("5G") network, a Code Division Multiple Access ("CDMA") network, etc. User device 205 may connect, via network 225, to data servers, application servers, other user devices 205, etc. Network 225 may be connected to one or more other networks, such as a public switched telephone network ("PSTN"), a public land mobile network ("PLMN"), and/or another network.

Figures 3A, 3B:
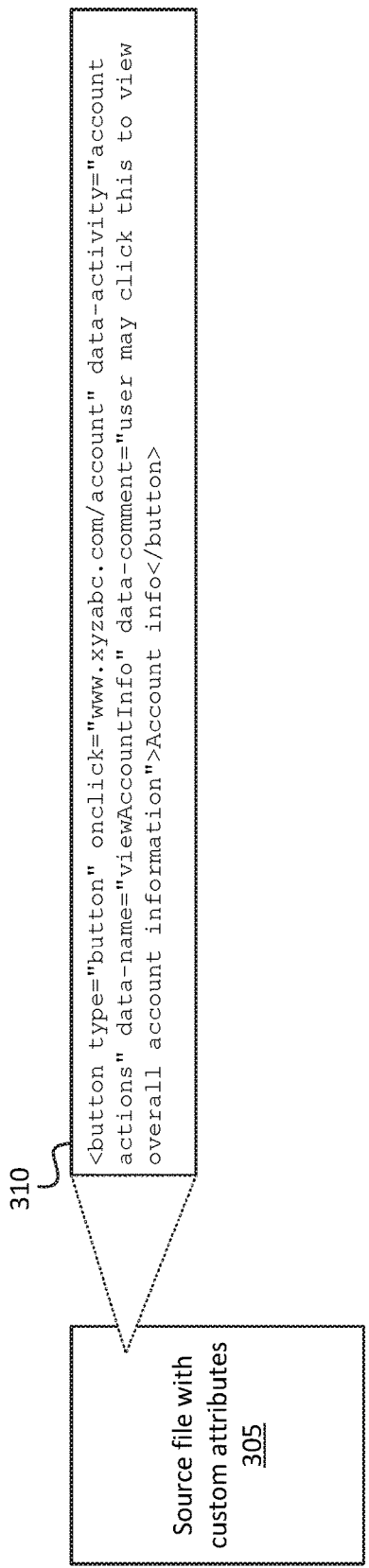
FIG. 3A illustrates an example of a source file that includes custom attributes for one or more components.
FIG. 3B illustrates an example data structure that includes information regarding a user interaction with a component that includes custom attributes.

FIG. 3A illustrates an example source file 305, which includes custom attributes which may facilitate detailed record generation, in accordance with some embodiments. Source file 305 may be, or may include, a Hyptertext Markup Language ("HTML") document (e.g., an HTML 5 document). Source file 305 may include XHR objects, which may correspond to user-selectable elements. For example, a particular XHR object may correspond to a component (e.g., a button) that may be selected by a user, where the component is associated with a request for content. As shown in FIG. 3A, a particular component may include a button. As one example, the source code (e.g., HTML code) for the button may include code 310: <button type="button" onclick="www.xyzabc corn/account" data-activity="account actions" data-name="viewAccountInfo" data-comment="user may click this to view overall account information">Account info</button>.

The above code may indicate that the type of the component is a button (as denoted by the "type" field). The button may cause the browser to retrieve content from www.xyzabc.com/account when clicked (as denoted by the "onclick" field). The button may also be associated with custom attributes, denoted by the fields beginning with "data-". For example, the button may be associated with an activity called "account actions" (as denoted by the "data-activity" field). The button may have a name, or identifier, of "viewAccountInfo" (as denoted by the "data-name" field) . The button may also be associated with a comment, "user may click this to view overall account information" (as denoted by the "data-comment" field). Code 310, shown in FIG. 3A, may, in some embodiments, not be the complete code associated with the button. In other embodiments, code 310 may fully represent the example button described above.

While some examples of custom attributes are provided here, in practice, additional, fewer, or different custom attributes may be included in source file 305. As one example, a custom attribute may include a flag (or other indicator) of whether performance associated with a particular component should be tracked. For instance, a component (e.g., a button, hyperlink, and/or other element that can be interacted with) may be associated with a custom attribute such as "data-track" may be set to a value of "true" or "false," where a "true" value indicates that performance tracking system 215 should track performance associated with the component, while a "false" value indicates that performance tracking system 215 should not track performance associated with the component. In some embodiments, performance tracking system 215 may by default track performance associated with all components that are not specifically flagged to indicate that performance should not be tracked. In other embodiments, performance tracking system 215 may by default not track performance associated with any component unless the component is flagged to indicate that performance should be tracked.

FIG. 3B illustrates an example data structure 315 that may be generated (e.g., by performance tracking system 215) when the button, described above with respect to code 310, is selected by a user. As shown, data structure 315 may include fields for the custom attributes "activity," "name," and "comment." Data structure 315 may also include a field for the URL associated with the button. Additionally, data structure 315 may include a field for a timestamp that indicates a time (e.g., a date and/or time) at which the button was selected (e.g., when a user initiated a request for content by selecting the button) and when the request was responded to (e.g., when the request was fulfilled by the content being provided to and/or rendered by a web browser). Data structure 315 may also include a field indicating the elapsed time to fulfill the request (e.g., the difference between the "request timestamp" and the "response timestamp" fields).

In some embodiments, performance tracking system 215 may be configured to generate data structure 315 with specific fields (e.g., the example fields described above), and may parse a source file (e.g., source file 305) to locate the custom attributes that match the names of the fields of data structure 315 (e.g., where the custom attribute "data-name" would correspond to the "name" field of data structure 315, and so on). In some embodiments, performance tracking system 215 may dynamically generate data structure 315 with fields that are determined based on parsing the source file. For example, data structure 315 may not initially include any fields related to custom attributes, but the fields may be added after parsing source file 305 and determining that custom attributes are included in source file 305.

Figures 4A, 4B:
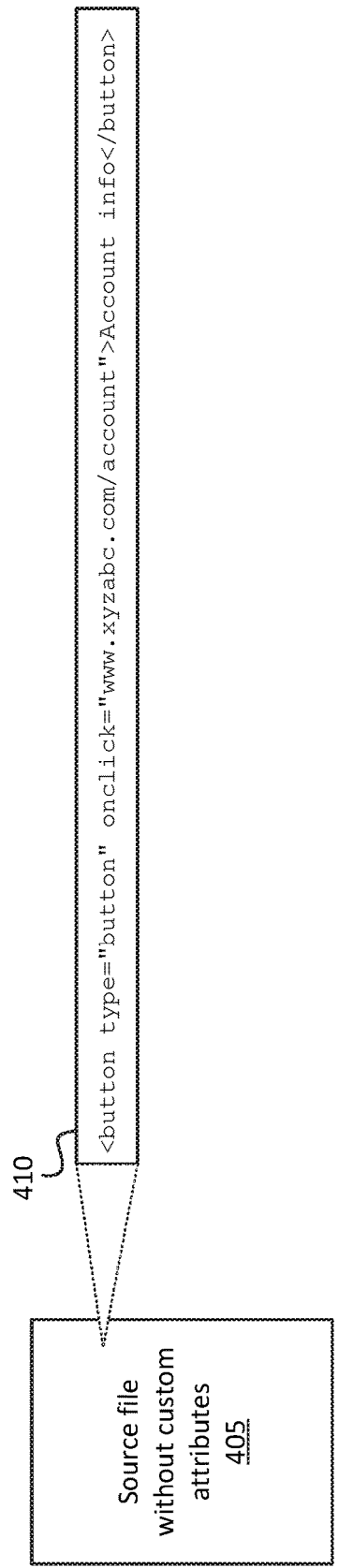
FIG. 4A illustrates an example of a source file that does not include custom attributes for one or more components.
FIG. 4B illustrates an example data structure that includes information regarding a user interaction with a component that does not include custom attributes.

FIG. 4A illustrates an example source file 405, which does not have any custom attributes. Source file 405 may have been developed or generated by an entity that has no knowledge of the performance metric evaluation performed according to one or more embodiments described herein. For example, similar to source file 305 discussed above, source file 405 may include an HTML file (e.g., an HTML 5 file). Source file 405 may include code 410, which specifies a button that is associated with the URL "www.xyzabc.com/account." However, in contrast with the button described in source file 305, the button described in source file 405 may not include any custom attributes.

FIG. 4B illustrates an example data structure 415 that may be generated (e.g., by performance tracking system 215) when the button, described above with respect to code 410, is selected by a user. As shown, data structure 415 may include the same fields as data structure 315 (e.g., fields for the custom attributes "activity," "name," and "comment," as well as fields for the URL associated with the button, a timestamp that indicates when the button was selected, when the request was responded to, and the elapsed time to fulfill the request.

As shown, the "activity" and "comment" fields may have a "null" value (e.g., no meaningful data), due to the button not being associated with those custom attributes. Additionally, even though the name of the button is not provided via a custom attribute, the "name" field of data structure 415 may be populated with an identifier (e.g., a unique identifier generated by performance tracking system 215—"button_A" in this example).

FIG. 5 illustrates an example data structure 505, which may include aggregated information regarding multiple requests, initiated by multiple users, and corresponding performance information for the requests. In this example, data structure 505 includes the same fields as those described above with respect to data structures 315 and 415, in addition to a field that includes a user identifier ("user ID"). The "user ID" field may include an identifier that includes an identifier of a user or a device via which a request is received (e.g., the selection of a graphical component, such as a button, a hyperlink, etc.) and to which content is provided in response to the request. The "user ID" may include, for example, a Mobile Directory Number ("MDN"), an International Mobile Station Equipment Identity ("IMEI"), an International Mobile Subscriber Identity ("IMSI") value, an Internet Protocol ("IP") address, and/or another identifier.

The identifier may be obtained and/or generated by a web application associated with one or more selectable components. For instance, a web application (e.g., as provided via source files 305 and/or 405) may obtain an identifier of user device 205 (e.g., an MDN, IMEI, etc.), and/or may generate a unique identifier for user device 205. The web application may store the identifier in a configuration file, as part of a session, and/or using some other suitable technique.

As described below, the aggregated information may be used (e.g., by analysis/alert system 220) to identify trends on the basis of one or more of the types of data stored by data structure 505. For instance, average response times (or other statistical functions of response times, such as median response times, maximum response times, minimum response times, standard deviations in response times, etc.) may be determined on a per-activity basis, a per-component basis (e.g., to identify one particular button, hyperlink, etc., that takes a particularly long time to respond to), a per-user basis, and/or on another basis.

FIG. 6, for example, illustrates an example data structure 605 that may be derived from the data stored by data structure 505. As shown, data structure 605 provides average response times on a per-component basis. For example, a component (e.g., button, hyperlink, etc.) named "viewAccountinfo" may have an average response time of 21 seconds, across all users for which performance information has been stored, while the component named "changeSub" may have an average response time of 10 seconds, across all users.

In some embodiments, data structure 605 may be further granularized. For instance, while not explicitly shown, data structure 605 may include information only from a subset of users (e.g., users within a certain geographic region, users within a certain demographic, etc.). This further granularization may be performed by correlating the data in data structure 505 with another data structure that includes suitable information (e.g., information regarding users' geographic locations, user demographics, etc.).

FIG. 7 illustrates another data structure 705 that may be derived from the data stored by data structure 505. As shown, data structure 705 provides average response times on a per-component-and-time of day basis, as well as on a per-component-and-region basis. For example, the component named "viewAccountingInfo" may be associated with an overall average response time of 21 seconds (e.g., across all regions and across all times of day). However, the average response time in the morning may be significantly shorter than in the evening (e.g., 7 seconds as opposed to 55 seconds). The terms "morning" and "evening," used in this figure, may be shorthand notations for specific times of the day (e.g., "morning" may refer to 5:00 AM-10:00 AM, "evening" may refer to 5:00 PM-10:00 PM, and so on).

As also shown in this figure, the average response time for the "viewAccountInfo" component in one region (e.g., the Eastern United States) may be 19 seconds, while the average response time for the same component in another region (e.g., the Western United States) may be 23 seconds. The terms "Western US" and "Eastern US," used in this figure may be shorthand notations for specific geographic regions (e.g., as defined in terms of latitude and longitude coordinates, ZIP codes, city names, county names, state names, or the like).

FIG. 8 illustrates an example data structure 805 which may provide insight on how long activities take to complete. For example, each row may relate to a particular activity, and may further be granularized. The amount of time for a particular activity may be the sum of the elapsed time for a group of components that are associated with the activity. For example, the "account actions" activity may be associated with the example components "viewAccountInfo," "changeSub" (referring to the example shown in FIG. 5), and one or more other components. Thus, the average response time associated with the "account actions" activity may be the sum of the average response times associated with the components "viewAccountInfo," "changeSub," and one or more other components associated with the activity. In some embodiments, the activity may only be counted as "completed" if all of the components associated with the activity have been interacted with by a user (e.g., if the user selects the "viewAccountInfo" component but not the "changeSub" component) within a particular time window (e.g., within a threshold amount of time, or within a given browser session). If an activity is not "completed," then that instance of the activity may not be counted for the purposes of calculating the average response time for that activity.

As further shown in the example in FIG. 8, the data may be granularized based on age of users. For instance, the "account actions" activity may be completed by users aged 18-24 in an average time of 4 minutes 32 seconds, users aged 25-34 may complete the activity in 5 minutes 31 seconds, and so on.

While FIGS. 6-8 illustrate examples of how data, relating to response times associated with components (or groups of components) may be arranged, in practice, other data structures may include other arrangements of the data. For example, the data relating to response times associated with components or activities may be granularized based on any available type of information (e.g., user demographics, type of device via which components are interacted with, type of network connectivity associated with a device via which components are interacted with, type of component (e.g., button, hyperlink, etc.), or any other type of available information), or combinations of different types of information.

Figure 9:
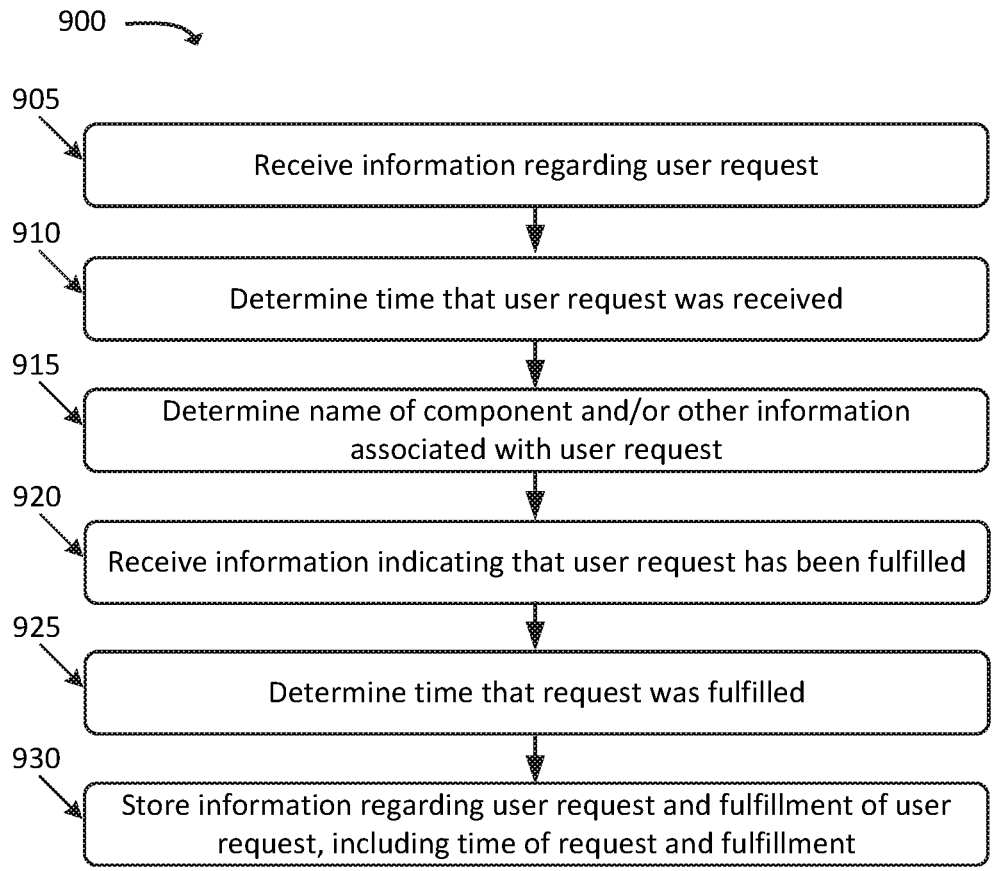
FIG. 9 illustrates an example process for storing information regarding a user interaction with a component.

FIG. 9 illustrates an example process 900 for determining information relating to users' interaction with components, and the response time associated with the interactions. In some embodiments, process 900 may performed by user device 205, performance tracking system 215, and/or one or more other devices. As discussed above, performance tracking system 215 may be implemented in part or entirely as a component (e.g., a hardware and/or software component) of user device 205. For the purposes of explanation, process 900 will be described below in the context of being performed by performance tracking system 215, with the understanding that performance tracking system 215 may be implemented in part or entirely as a component of user device 205.

Process 900 may include receiving (at 905) information regarding a user request. For example, performance tracking system 215 may receive (e.g., from a browser application being executed at user device 205) information regarding a user request. The request may be a request for a resource (e.g., a web page and/or other content) associated with a particular URL. The information associated with the request may indicate, for example, that a component has been interacted with (e.g., a button, hyperlink, and/or some other selectable component in a web page displayed by the browser application). As also discussed above, performance tracking system 215 may include a library, a plug-in, and/or some other software logic that communicates with the browser application. The browser application may notify performance tracking system 215 regarding the user request.

Process 900 may further include determining (at 910) a time at which the user request was received. For example, performance tracking system 215 may record information indicating when the user request was received (at 905). Performance tracking system 215 may store the information in a data structure (e.g., as similarly discussed above with respect to data structures 315, 415, and so on).

Process 900 may additionally include determining (at 915) a name of a component and/or other information associated with the request. For instance, the browser may pass information to performance tracking system 215, regarding the component associated with the request. In some embodiments, the request may be, or may include, an XHR request. In some embodiments, performance tracking system 215 may receive and/or analyze code (e.g., HTML code) associated with the web page and/or with the request. As discussed above (e.g., with respect to code 310 and/or code 410), this code may indicate a name of the component, which may have been specified via a custom attribute (e.g., the "data-name" custom attribute, as discussed above with respect to code 310). In some scenarios, the code may not indicate a name of the component (e.g., as discussed above with respect to code 410). In situations where the name of the component is not provided (e.g., is not provided via a custom attribute), performance tracking system 215 may generate a name and/or other unique identifier for the component (e.g., "button_A," as discussed above with respect to FIG. 4B). In some embodiments, the generated identifier may be a random or pseudorandom string. In some embodiments, the generated identifier may indicate a type of the component (e.g., "button_A" may indicate that the component is a button, "hyperlink_A" may indicate that the component is a hyperlink, etc.).

In some embodiments, performance tracking system 215 may insert information associated with the component into the request, prior to the request being sent. For instance, the request may be associated with an XHR object, and performance tracking system 215 may insert the name of the component (and/or other information, such as the URL associated with the component) into the XHR request. In some embodiments, the request may include an HTTP request, and performance tracking system 215 may insert the name of the component as a parameter of the HTTP request (e.g., using a "?" character, or by denoting the parameter in some other way). The name may be inserted into the request so that when a response to the request is received, performance tracking system 215 may be able to correlate the response to the request itself.

Process 900 may also include receiving (at 920) information indicating that the request has been fulfilled. For instance, the browser application may notify performance tracking system 215 once the request has been fulfilled (e.g., once the resource associated with the component has been received by the browser application). When receiving the resource, the browser application may receive a response to the XHR request, a response to an HTTP request, or another suitable response from a provider of the content (e.g., content provider 210).

Process 900 may further include determining (at 925) a time that the request was fulfilled. For example, performance tracking system 215 may store information indicating when the response was received by the browser application. In scenarios where the response includes an XHR response, the XHR response may include a timestamp indicating when the request was fulfilled. In some embodiments, the response may include information that performance tracking system 215 can use to correlate the response to the user request. For example, the XHR response may include the name of the component (or the name generated by performance tracking system 215, in situations where the component is not associated with a custom attribute that provides the name). In some embodiments, the XHR response may include one or more other types of information that performance tracking system 215 can compare to the request in order to determine matching information.

In some embodiments, performance tracking system 215 may maintain a stack (e.g., a last-in-first-out queue) of user requests, and may correlate received content to user requests based on a last-in-first-out basis. For instance, when receiving content (e.g., an XHR response to an XHR request), performance tracking system 215 may determine that the XHR response is associated with the most recent XHR request in the queue (and may then remove this request from the queue). In some embodiments, performance tracking system 215 may maintain a first-in-first-out queue (e.g., in lieu of a last-in-first-out queue) of user requests, and may correlate received content (e.g., XHR responses) to user requests on a first-in-first-out basis.

Process 900 may additionally include storing (at 930) information regarding the user request and the fulfillment of the user request, including the times of the request and the fulfillment of the request. For example, performance tracking system 215 may store the information in a data structure, such as that shown in the example data structure 505 in FIG. 5. In some embodiments, performance tracking system 215 may store any or all information associated with the selected component, including custom attributes indicated in the code (e.g., HTML code) for the component. As discussed below, this data may be useful in a variety of ways, such as determining activities and/or components that take longer than expected or acceptable to complete (e.g., response time is above a threshold), determining device types that take longer than other device types to complete the same or similar requests, determining user demographics as they relate to how long requests take to complete, etc. To that end, performance tracking system 215 may output some or all of the collected information to a device or system (e.g., analysis/alert system 220) that analyzes the data in order to identify trends associated with the data.

Figure 10:
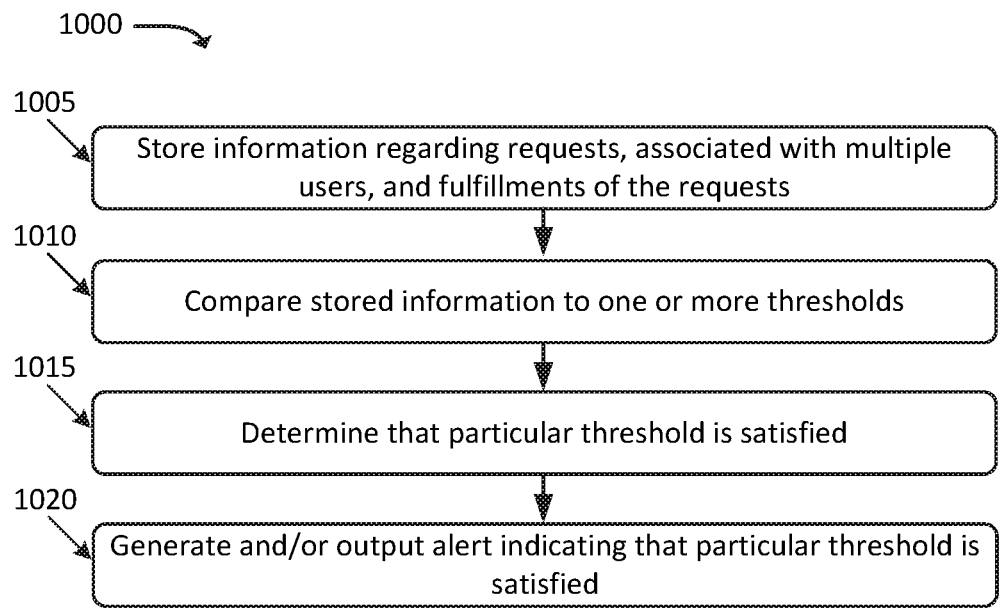
FIG. 10 illustrates an example process for analyzing aggregate information regarding multiple user interactions with one or more components.

FIG. 10 illustrates an example process 1000 for generating alerts relating to performance information regarding user requests and responses to the requests (e.g., as discussed above with respect to FIG. 9). In some embodiments, process 1000 may be performed by analysis/alert system 220. In some embodiments, analysis/alert system 220 may perform some or all of process 1000 in conjunction with one or more other devices (e.g., user device 205 and/or performance tracking system 215).

Process 1000 may include storing (at 1005) information regarding requests, associated with multiple users, and the fulfillment of the requests. For example, analysis/alert system 220 may receive the information from performance tracking system 215 (or from multiple performance tracking systems 215), which may have collected information (e.g., as discussed above with respect to process 900) regarding requests made by multiple (e.g., dozens, hundreds, hundreds of thousands, or more) users. The information may be stored in a data structure similar to that shown above with respect to FIG. 5. For example, each row shown in data structure 500 may correspond to a particular request made by a particular user (note that multiple requests by the same user would, in this example, correspond to multiple rows, such as the multiple rows associated with "user_D").

Process 1000 may additionally include comparing (at 1010) the stored information to one or more thresholds. For instance, analysis/alert system 220 may compare certain aspects of the stored information to thresholds that are relevant in determining performance metrics. In order to do so, analysis/alert system 220 may generate aggregated data based on information received for multiple users, multiple requests, etc., as described above with respect to, for example, FIGS. 6-8. In some embodiments, analysis/alert system 220 may access an external source of information (e.g., a subscriber database associated with a wireless telecommunications network) in order to analyze performance metrics based on additional information not provided by performance tracking system 215. For instance, assume that performance tracking system 215 collects information regarding example users "user_A," "user_B," and "user_C." Performance tracking system 215 may access the external source to identify demographic information associated with the users, geographic information associated with the users (e.g., a state, county, country, latitude and longitude coordinates, etc.), a device type associated with each of the users, etc. Performance tracking system 215 may use this additional information to granularize the data received from performance tracking system 215 (e.g., to generate data structures similar to those shown in FIGS. 6-8).

Referring to example data structure 700, analysis/alert system 220 may be configured with thresholds related to average response times for the "viewAccountInfo" component and the "changeSub" component. These components may, in some embodiments, be associated with different thresholds. For example, the "viewAccountInfo" component may be associated with an average response time threshold of 30 seconds, while the "changeSub" component may be associated with an average response time threshold of 10 seconds. Analysis/alert system 220 may compare the aggregated values (e.g., the "average response time" fields) to the thresholds, and may determine that the "viewAccountInfo" component does not satisfy (e.g., meet or exceed) the threshold (i.e., 21 seconds is less than 30 seconds), while the "changeSub" component does satisfy the threshold (i.e., 10 seconds is equal to the 10 second threshold). Additionally, the other fields in example data structure 705 may be compared to the respective thresholds (e.g., the "average response time (morning)" field, the "average response time (evening)" field, etc.). In some embodiments, each field may be associated with a different threshold (e.g., the "average response time" field for the "viewAccountInfo" component may be associated with a threshold of 30 seconds, while the "average response time (morning)" field for the same component may be associated with a threshold of 10 seconds).

In some embodiments, analysis/alert system 220 may compare the data to the thresholds on an ongoing basis (e.g., on a period or intermittent basis). In some embodiments, analysis/alert system 220 may compare the data to the thresholds whenever new data is received from performance tracking system 215. In some embodiments, analysis/alert system 220 may compare data from rolling time windows to the thresholds. For instance, analysis/alert system 220 may only compare data from the most recent hour, the most recent day, the most recent week, etc. to the thresholds.

Process 1000 may further include determining (at 1015) that a particular threshold has been satisfied. For example, referring to the example discussed above, analysis/alert system 220 may determine that the "changeSub" component satisfies the threshold (i.e., 10 seconds is equal to the 10 second threshold).

Process 1000 may additionally include generating and/or outputting (at 1020) an alert indicating that the particular threshold has been satisfied. For example, analysis/alert system 220 may output an alert message (e.g., an email, a text message, and/or some other suitable type of message), via network 225, to a device (e.g., a workstation) associated with, for example, an administrator, content provider 210, and/or some other device or system. In some embodiments, analysis/alert system 220 may maintain a record of which components were associated with response times that exceeded a corresponding threshold. In some embodiments, different thresholds may be used for the same component for different types of reporting. For instance, if a particular component satisfies a first threshold (e.g., requests associated with the component take a relatively long time to complete), then analysis/alert system 220 may maintain a record that the threshold was satisfied, but if the component satisfies a second threshold (e.g., requests associated with the component take even longer to complete), then analysis/alert system 220 may output an alert to an administrator and/or another entity.

Figure 11:
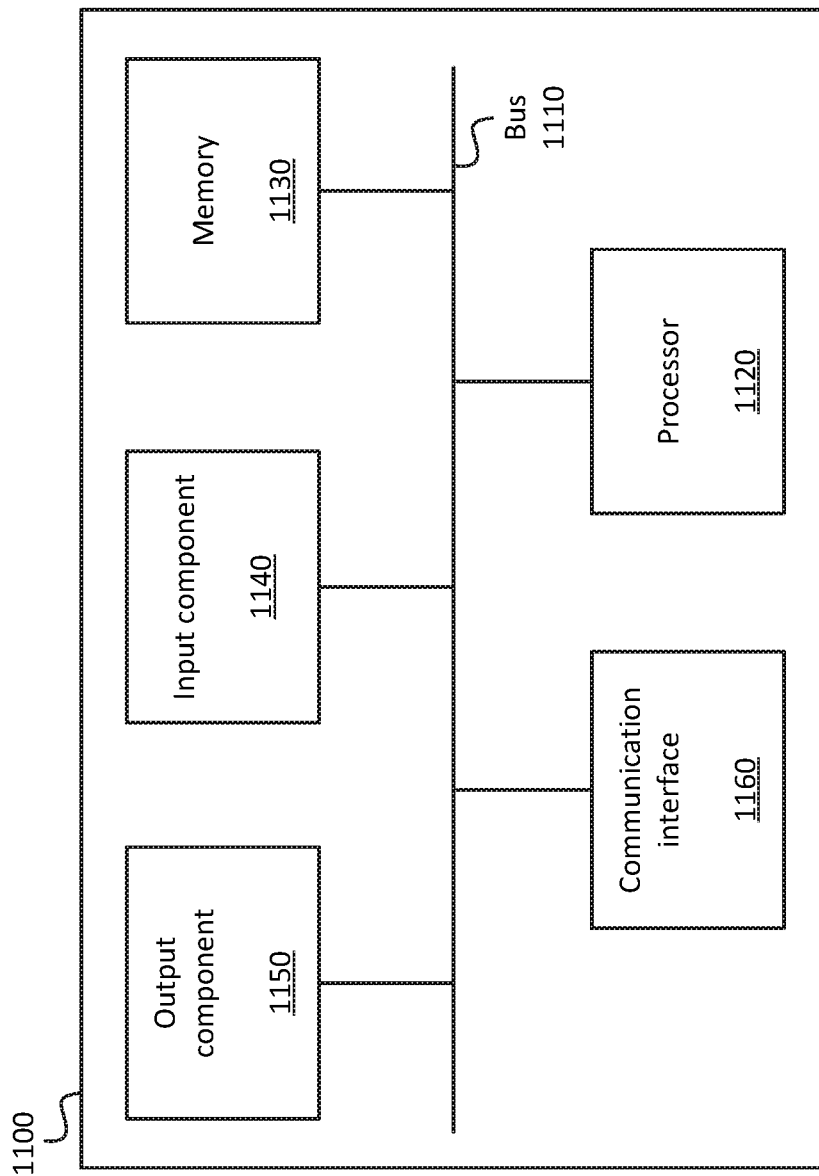
FIG. 11 illustrates example components of one or more devices, according to one or more embodiments described herein.

FIG. 11 illustrates example components of device 1100. One or more of the devices described above may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes ("LEDs"), etc. Input component 1140 may include one or more input devices and/or sensors (e.g., input devices 305 and/or sensors 325, as described above).

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks have been described with regard to FIGS. 4 and 5, the order of the blocks may be modified in other implementations. Further, non-dependent blocks may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. To the extent that the term "greater than" (or similar terms) is used herein to describe a relationship of a value to a threshold, it is to be understood that the term "greater than or equal to" (or similar terms) could be similarly contemplated, even if not explicitly stated. Similarly, to the extent that the term "less than" (or similar terms) is used herein to describe a relationship of a value to a threshold, it is to be understood that the term "less than or equal to" (or similar terms) could be similarly contemplated, even if not explicitly stated. Further, the term "satisfying," when used in relation to a threshold, may refer to "being greater than a threshold," "being greater than or equal to a threshold," "being less than a threshold," "being less than or equal to a threshold," or other similar terms, depending on the appropriate con text.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A system, comprising:
   a non-transitory computer-readable medium storing a set of processor-executable instructions; and
   one or more processors configured to execute the set of processor-executable instructions, wherein executing the set of processor-executable instructions causes the one or more processors to:
   parse source code of a web page to determine that a first graphical element, associated with the web page, is associated with a particular identifier;
   parse the source code of the web page to determine that a second graphical element, associated with the web page, is associated with the same particular identifier;
   determine that a first Extensible Markup Language ("XML") Hypertext Transfer Protocol ("HTTP") Request ("XHR") request has been received via a web browser application that is executed by a user device, the first XHR request being associated with a first user interaction with the first graphical element that is included in the web page presented by the web browser application, wherein fulfilling the first XHR request includes obtaining and presenting first content without reloading the web page;
   determine that a second XHR request has been received via the web browser application that is executed by the user device, the second XHR request being associated with a second user interaction with a second graphical element that is included in the web page presented by the web browser application, wherein fulfilling the second XHR request includes obtaining and presenting second content without reloading the web page;
   determine a first start time that is associated with the first XHR request, wherein the first start time indicates when the first XHR request was received;
   determine that the first content has been provided to the user device in response to the first XHR request;
   determine, based on the determination that the first content has been provided to the user device, a first end time that is associated with the first XHR request, wherein the difference between the first start time and the first end time indicates how long the first XHR request took to provide the first content to the user device;
   determine a second start time that is associated with the second XHR request, wherein the second start time indicates when the second XHR request was received;
   determine that the second content has been provided to the user device in response to the second XHR request;
   determine, based on the determination that the second content has been provided to the user device, a second end time that is associated with the second XHR request, wherein the difference between the second start time and the second end time indicates how long the second XHR request took to provide the second content to the user device;
   determine a performance metric, associated with the particular identifier, based on:
   how long the first XHR request took to fulfill, and
   how long the second XHR request took to fulfill;
   compare the performance metric to a threshold;
   determine, based on the comparison, that the performance metric does not satisfy the threshold; and
   output, based on the determination, an alert indicating that the performance metric does not satisfy the threshold.

2. The system of claim 1, wherein the processor-executable instructions, to determine the performance metric, include processor-executable instructions to determine an average or a median of:
  how long the first XHR request took to fulfill, and
  how long the second XHR request took to fulfill.

3. The system of claim 1, wherein the processor-executable instructions, to determine that the content, of the first and the second content, has been provided to the user device, include processor-executable instructions to:
  determine that a response to each XHR request, of the first and second XHR requests, includes the particular identifier.

4. The system of claim 1, wherein each graphical element, of the first and second graphical elements, includes at least one of:
  a button, or
  a hyperlink.

5. The system of claim 1, wherein the processor-executable instructions further cause the one or more processors to:
  identify demographic information associated with a user of the user device; and
  identify a plurality of user devices that are associated with a same demographic information as the demographic information associated with the user of the user device,
  wherein the determination of the performance metric is further based on how long one or more other requests, made via one or more other instances of the first and second graphical elements presented via the plurality of user devices that are associated with the same demographic information as the demographic information associated with the user of the user device, took to fulfill.

6. The system of claim 1, wherein the determination that the request for each content, of the first content and second content, has been received via the web browser application is performed by a plug-in that communicates with the web browser application and is executed by the user device.

7. The device of claim 1, wherein the first and second graphical elements are respectively associated with first and second tags in the source code,
  wherein the first tag includes a first element name associated with the first graphical element,
  wherein the second tag includes a second element name associated with the second graphical element, the first and second element names being different, and
  wherein the first and second tags further include the same particular identifier.

8. A non-transitory computer-readable medium, storing a set of processor-executable instructions, which, when executed by one or more processors, cause the one or more processors to:
  parse source code of a web page to determine that a first graphical element, associated with the web page, is associated with a particular identifier;
  parse the source code of the web page to determine that a second graphical element, associated with the web page, is associated with the same particular identifier;
  determine that a first Extensible Markup Language ("XML") Hypertext Transfer Protocol ("HTTP") Request ("XHR") request has been received via a web browser application that is executed by a user device, the first XHR request being associated with a first user interaction with the first graphical element that is included in the web page presented by the web browser application, wherein fulfilling the first XHR request includes obtaining and presenting first content without reloading the web page;
  determine that a second XHR request has been received via the web browser application that is executed by the user device, the second XHR request being associated with a second user interaction with a second graphical element that is included in the web page presented by the web browser application, wherein fulfilling the second XHR request includes obtaining and presenting second content without reloading the web page;
  determine a first start time that is associated with the first XHR request, wherein the first start time indicates when the first XHR request was received;
  determine that the first content has been provided to the user device in response to the first XHR request;
  determine, based on the determination that the first content has been provided to the user device, a first end time that is associated with the first XHR request, wherein the difference between the first start time and the first end time indicates how long the first XHR request took to provide the first content to the user device;
  determine a second start time that is associated with the second XHR request, wherein the second start time indicates when the second XHR request was received;
  determine that the second content has been provided to the user device in response to the second XHR request;
  determine, based on the determination that the second content has been provided to the user device, a second end time that is associated with the second XHR request, wherein the difference between the second start time and the second end time indicates how long the second XHR request took to provide the second content to the user device;
  determine a performance metric, associated with the particular identifier, based on:
    how long the first XHR request took to fulfill, and
    how long the second XHR request took to fulfill;
  compare the performance metric to a threshold;
  determine, based on the comparison, that the performance metric does not satisfy the threshold; and
  output, based on the determination, an alert indicating that the performance metric does not satisfy the threshold.

9. The non-transitory computer-readable medium of claim 8, wherein the processor-executable instructions, to determine the performance metric, include processor-executable instructions to determine an average or a median of:
  how long the first XHR request took to fulfill, and
  how long the second XHR request took to fulfill.

10. The non-transitory computer-readable medium of claim 8, wherein the processor-executable instructions, to determine that the content, of the first and second content, has been provided to the user device, include processor-executable instructions to:
  determine that a response to each XHR request, of the first and second XHR requests, includes the particular identifier.

11. The non-transitory computer-readable medium of claim 8, wherein each graphical element, of the first and second graphical elements, includes at least one of:
  a button, or
  a hyperlink.

12. The non-transitory computer-readable medium of claim 8, wherein the processor-executable instructions further include processor-executable instructions to:

identify demographic information associated with a user
of the user device;
identify a plurality of user devices that are associated with
a same demographic information as the demographic
information associated with the user of the user device,
wherein the determination of the performance metric is
further based on how long one or more other requests,
made via one or more other instances of the first and
second graphical elements presented via the plurality of
user devices that are associated with the same demographic information as the demographic information
associated with the user of the user device, took to
fulfill.

13. The non-transitory computer-readable medium of claim 8, wherein the determination that the request for each content, of the first and second content, has been received via the web browser application is performed by a plug-in that communicates with the web browser application and is executed by the user device.

14. The non-transitory computer-readable medium of claim 8, wherein the first and second graphical elements are respectively associated with first and second tags in the source code,
    wherein the first tag includes a first element name associated with the first graphical element,
    wherein the second tag includes a second element name associated with the second graphical element, the first and second element names being different, and
    wherein the first and second tags further include the same particular identifier.

15. A method, comprising:
    parsing, by the one or more processors, source code of a web page to determine that a first graphical element, associated with the web page, is associated with a particular identifier;
    parsing, by the one or more processors, the source code of the web page to determine that a second graphical element, associated with the web page, is associated with the same particular identifier;
    determining, by one or more processors, that a first Extensible Markup Language ("XML") Hypertext Transfer Protocol ("HTTP") Request ("XHR") request has been received via a web browser application that is executed by a user device, the first XHR request being associated with a first user interaction with the first graphical element that is included in the web page presented by the web browser application, wherein fulfilling the first XHR request includes obtaining and presenting first content without reloading the web page;
    determining, by the one or more processors, that a second XHR request has been received via the web browser application that is executed by the user device, the second XHR request being associated with a second user interaction with a second graphical element that is included in the web page presented by the web browser application, wherein fulfilling the second XHR request includes obtaining and presenting second content without reloading the web page;
    determining, by the one or more processors, a first start time that is associated with the first XHR request, wherein the first start time indicates when the first XHR request was received;
    determining, by the one or more processors, that the first content has been provided to the user device in response to the first XHR request;
    determining, by the one or more processors and based on the determination that the first content has been provided to the user device, a first end time that is associated with the first XHR request, wherein the difference between the first start time and the first end time indicates how long the first XHR request took to provide the first content to the user device;
    determining, by the one or more processors, a second start time that is associated with the second XHR request, wherein the second start time indicates when the second XHR request was received;
    determining, by the one or more processors, that the second content has been provided to the user device in response to the second XHR request;
    determining, by the one or more processors and based on the determination that the second content has been provided to the user device, a second end time that is associated with the second XHR request, wherein the difference between the second start time and the second end time indicates how long the second XHR request took to provide the second content to the user device;
    determining, by the one or more processors, a performance metric, associated with the particular identifier, based on:
        how long the first XHR request took to fulfill, and
        how long the second XHR request took to fulfill;
    comparing, by the one or more processors, the performance metric to a threshold;
    determining, by the one or more processors and based on the comparison, that the performance metric does not satisfy the threshold; and
    outputting, by the one or more processors and based on the determination, an alert indicating that the performance metric does not satisfy the threshold.

16. The method of claim 15, wherein determining the performance metric includes determining an average or a median of:
    how long the first XHR request took to fulfill, and
    how long the second XHR request took to fulfill.

17. The method of claim 15, wherein determining that the content, of the first and second content, has been provided to the user device includes:
    determining that a response to each XHR request, of the first and second XHR request, includes the particular identifier.

18. The method of claim 15, wherein each graphical element, of the first and second graphical elements, includes at least one of:
    a button, or
    a hyperlink.

19. The method of claim 15, further comprising:
    identifying demographic information associated with a user of the user device; and
    identifying a plurality of user devices that are associated with a same demographic information as the demographic information associated with the user of the user device,
    wherein the determination of the performance metric is further based on how long one or more other requests, made via one or more other instances of the first and second graphical elements presented via the plurality of user devices that are associated with the same demographic information as the demographic information associated with the user of the user device, took to fulfill.

20. The method of claim 15, wherein the first and second graphical elements are respectively associated with first and second tags in the source code, wherein the first tag includes a first element name associated with the first graphical element,
wherein the second tag includes a second element name associated with the second graphical element, the first and second element names being different, and
wherein the first and second tags further include the same particular identifier.

\* \* \* \* \*